United States Patent [19]

Foster

[11] 3,934,481
[45] Jan. 27, 1976

[54] AUTOMATIC FRICTION DRIVE TRANSMISSION

[76] Inventor: Donald A. Foster, 78 Winthrop Road, Brookline, Mass. 02146

[22] Filed: Jan. 3, 1975

[21] Appl. No.: 538,347

[52] U.S. Cl. .................. 74/190.5; 74/194; 74/212; 280/236; 280/238
[51] Int. Cl.² .................. F16H 15/04; F16H 15/10
[58] Field of Search .......... 74/190.5, 194, 197, 212, 74/196, 336.5, 190; 280/236, 238

[56] References Cited
UNITED STATES PATENTS

| | | | |
|---|---|---|---|
| 1,185,616 | 6/1916 | Bjorneby et al. | 74/194 |
| 1,203,238 | 10/1916 | Motley et al. | 74/194 |
| 2,956,443 | 10/1960 | Nelson | 74/336.5 |
| 3,863,503 | 2/1975 | Loeb et al. | 280/238 |

*Primary Examiner*—Samuel Scott
*Assistant Examiner*—Allan R. Burke

[57] ABSTRACT

A transmission for a pedal-propelled vehicle has a drive shaft rotated by a crankset and disposed radially with respect to the driving wheel of the vehicle. A friction wheel is slidably connected to the shaft by a one-way clutch and is in engagement with a friction member connected to the driving wheel to rotate therewith. The friction wheel includes a tubular shaft through which the drive shaft extends. A shifting unit is connected to the friction wheel by means of the tubular shaft to slide along the drive shaft therewith but is held against turning. The shifting unit includes a gear train having a pinion in mesh with a fixed rack parallel to the drive shaft. First and second normally inoperative connections between the tubular shaft and the gear train are provided, the first to drive the gear train to rotate the pinion to shift the unit and the friction wheel towards the axis of the friction member and the second to drive the gear train to shift the unit and friction wheel towards the periphery thereof. The connections are made by a control including means responsive to the speed of the tubular shaft and means, adjustable by the operator, resiliently opposing the speed responsive means. When the speed responsive means is dominant, the first connection is rendered operative, when the resilient means is dominant, the second connection is rendered operative, and when neither means is dominant, a neutral is established with neither connection operative, the transmission thereby effecting ratio changes in relation to the wanted rate of pedalling or cadence that is established by the resilient means.

18 Claims, 19 Drawing Figures

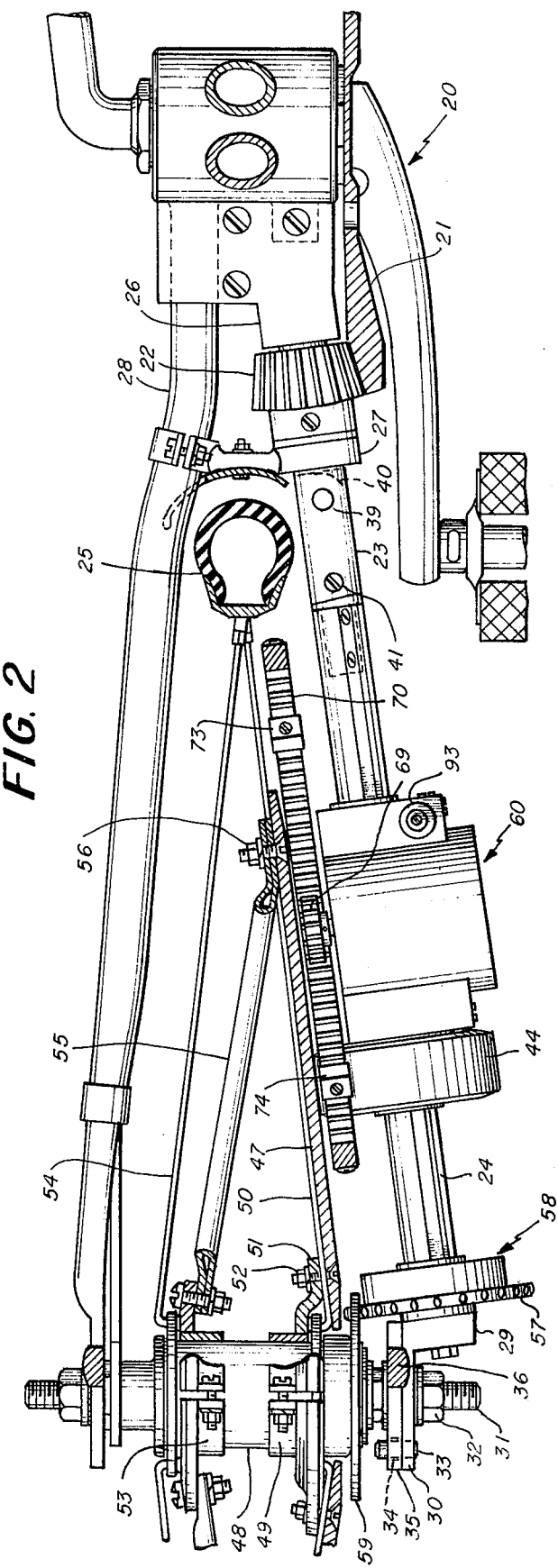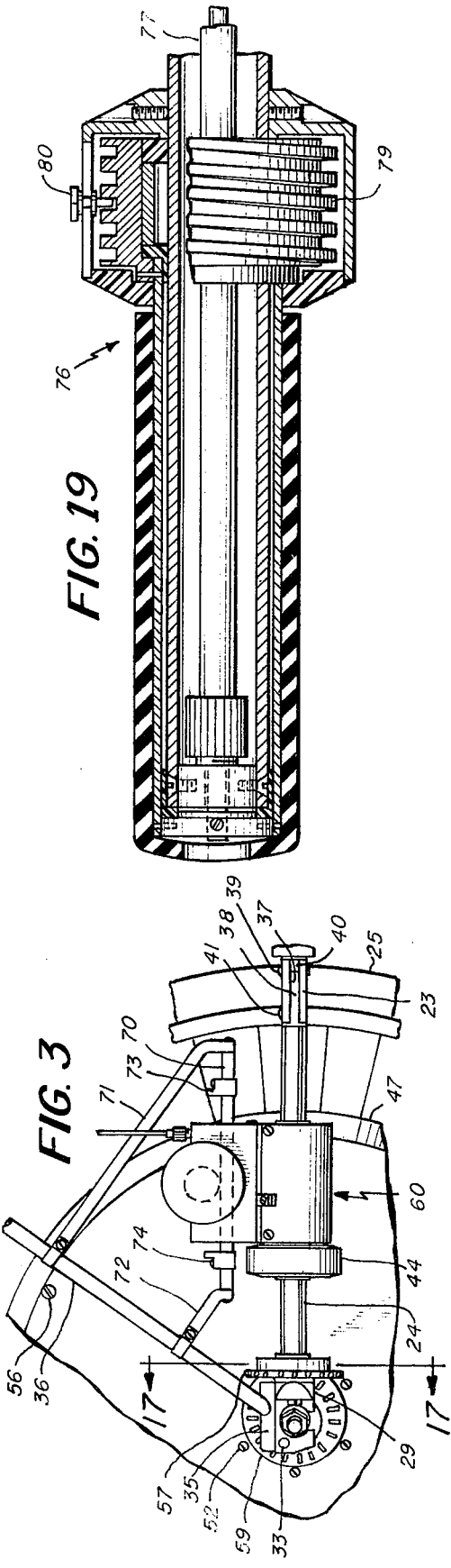

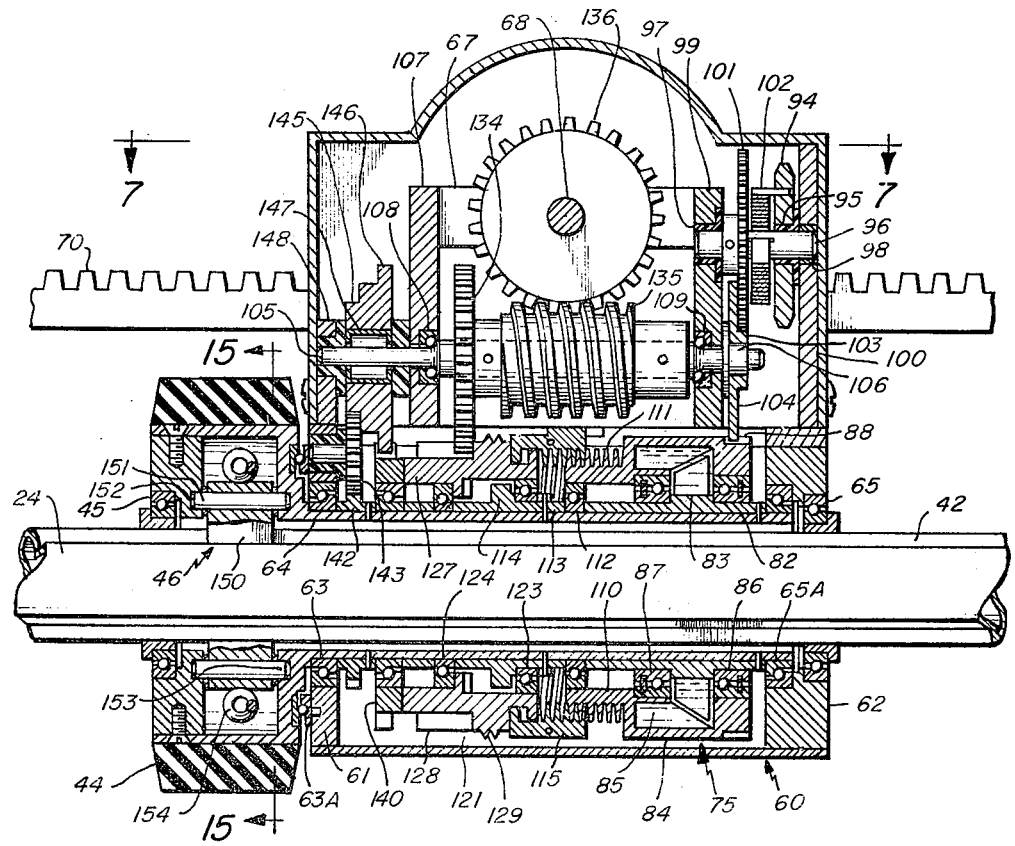
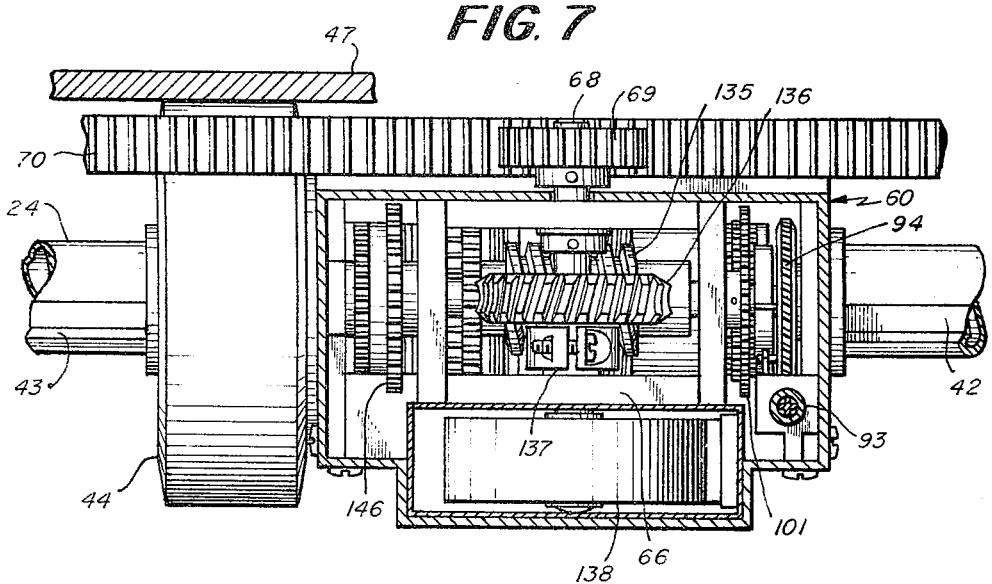

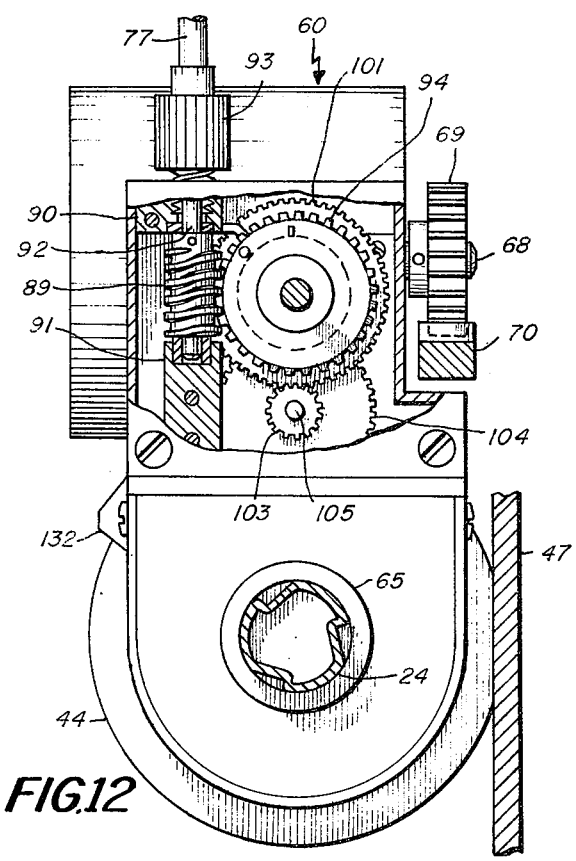

AUTOMATIC FRICTION DRIVE TRANSMISSION

BACKGROUND REFERENCES

U.S. Pat. No. 1,185,616;
U.S. Pat. No. 1,203,238;
U.S. Pat. No. 2,956,443.

BACKGROUND OF THE INVENTION

In operating a conventional multi-speed bicycle, the experienced cyclist endeavors to maintain constant torque and pedalling cadence by selecting discrete gear ratios that approximately compensate for wide variations in vehicle momentum. Gear changes are accomplished by hand lever manipulation together with a specific pedalling attitude required by design type. This necessary shifting activity temporarily suspends free operator choices in pedalling cadence, requires positional displacement of one hand from its normally stabilizing grip position, and results in non-optimum gear selection during periods of changing vehicle momentum. In the lattermost circumstance, it is not uncommon to suffer loss of operational balance while changing gears under conditions of more rapidly changing vehicle momentum. A further difficulty common to multiple gear transmissions results from certain design limitations which operatively prohibit utilization of water resistant, high torque safety or coaster brakes.

THE PRESENT INVENTION

The general objective of the present invention is to provide an automatic shift capability for light weight vehicles using a friction drive, particularly but not necessarily for bicycles, that will increase operative efficiency and safety by eliminating the above generally indicated causes of operator difficulty with ratio changes occuring automatically to enable the rate of pedalling or cadence to be maintained substantially constant.

In accordance with the invention, this general objective is attained with a vehicle having a friction member mounted coaxially with the driving wheel to rotate therewith. A drive shaft, connected to the driving means, positioned close to and radially with respect to the friction member. The transmission includes a unit slidably mounted on the drive shaft with the shaft rotatable independently thereof and a friction wheel connected to said shaft to slide therealong and to rotate therewith when the drive shaft is rotated in a wheel-advancing direction. The friction wheel and the unit are connected so that they slide together along the drive shaft and the periphery of the friction wheel is in engagement with a face of the friction member with the ratio of revolution between the shaft and the friction member dependent on the radial position of the friction wheel relative to the friction member. The unit has means operable to shift the friction wheel and the unit along the shaft and includes first and seocnd engageable connections, the first, when operative, shifting the friction wheel and the unit towards the axis of the friction member. The unit also includes a control having means responsive to the speed of the friction wheel and means resiliently opposing the speed responsive means to provide a neutral with neither connection operative. The control renders the first connection operative if the speed responsive means is dominant and the second connection operative if the resilient means is dominant.

Another objective of the invention is to provide shifting means that are positive in operation, an objective attained by providing the transmission with a fixed rack parallel to the drive shaft and provide the unit with a gear train having a pinion in mesh with the rack. The unit includes a shifter operable to render either of the connections operative and the shifter is positioned by the control.

Another objective of the invention is to provide an effective control, an objective attained by providing the friction wheel with a tubular shaft through which the drive shaft extends and relative to which the drive shaft is rotatable. A sealed, liquid-filled turbine assembly includes a base provided with blades and secured to the tubular shaft to rotate therewith and an independently rotatable cylindrical housing provided with an internal series of stator blades with its rotation opposed by the resilient means of the control. The rotatable turbine housing is provided with a cylindrical portion on which is threaded a cylindrical actuator held against rotation and having a rotatable connection with the shifter so that the actuator moves axially as the turbine housing turns, in one direction by the speed responsive means and in the other direction by the resilient means and causes corresponding axial movement of the shifter. The shifter includes an external circular series of teeth that constitute the first or driving gear of the gear train and first and second axially spaced ring gears, the first, part of the first connection and the second, part of the second connection and the teeth of the driving gear are of substantial axial extent in order to permit either ring gear to complete the appropriate connection with the friction wheel as well as to provide a neutral position in which neither connection is operative.

Another objective of the invention is to provide appropriate first and second connections, the second connection including a ring gear fastened on the tubular shaft and disposed to engage and be coupled to the second ring gear of the shifter on appropriate forward movement of the shifter from its neutral position. The first connection including a ring gear rotatable independently of the tubular shaft through a gear train establishing its rotation in a direction counter to that of the tubular shaft and in a position to be engaged and be coupled to the first ring gear of the shifter on appropriate rearward movement of the shifter from a neutral position.

Another objective of the invention is to enable the resistance of the resilient means of the control to the operation of the speed response means thereof to be varied, an objective attained by providing the resilient means with a spring operated by a cable connected to a rotatable control, desirably in the form of a handlebar grip.

Another objective of the invention is to ensure non-slip rotational performance of the friction wheel, an objective attained at all speeds by a relationship between the drive shaft and the friction member such that the friction member engages with progressively greater pressure upon the friction wheel as the latter is caused to translate radially towards the circumference of the friction member during conditions of speed reduction.

A further objective of the invention is to provide assistance to the operator, in gaining momentum from condition of zero or lower speeds, by the utility of energy stored for translating the friction wheel towards positions of increased speed, an objective attained by providing that the gear train includes a gear mounted on the pinion gear shaft for rotation independently thereof but connected thereto by a friction clutch and by employing a coil spring that is connected to the pinion gear shaft in a manner such that its unwinding force so rotates the pinion gear shaft that the friction wheel is urged thereby towards the axis of the friction member when the gear train is driven in the appropriate direction.

Yet another objective of the invention is to provide dynamic braking that is directly proportional to desired vehicle speed reductions, an objective attained by the storing of energy in the above referred-to coil spring as an incident of the translation of the friction wheel towards the circumference of the friction member during which the coil spring is wound and the kinetic energy supplied by the driving wheel is reduced.

Yet another objective of the invention is to permit utilization of internal rear hub coaster or safety brakes, an objective attained by positioning a cog gear on the drive shaft in mesh with a rear wheel, hub-mounted slotted gear, the latter replacing the drive coaster brake sprocket gear of conventional chain driven single and three-speed bicycle designs. The cog gear includes a one-way clutch operable to connect it to the drive shaft to rotate therewith when the crankset is rotated in an attitude of back pedalling.

None of the patents previously referred-to is able to attain the objectives of the present invention. While both the patent to Bjorneby et al., U.S. Pat. No. 1,185,616, and the patent to Motley et al., U.S. Pat. No. 1,203,238, disclosed variable friction drives, neither derived power from the friction wheel to cause its translation or caused translation in response to the speed of the drive member. The patent to Nelson, U.S. Pat. No. 2,956,443, related to an automatic variable speed transmission for a bicycle or motorcycle in which a friction wheel, driven by the rear wheel, actuated the shifting means to provide either a direct drive or two different speed drives, each of different fixed gear ratio.

BRIEF DESCRIPTION OF THE DRAWINGS

In the accompanying drawings there are shown embodiments of the invention illustrative of these and other of its objectives, novel features and advantages and in the drawings.

FIG. 2 is a view, on a substantial increase in scale, taken approximately along the indicated line 2—2 of FIG. 1;

FIG. 3 is a fragmentary side view of the transmission and rear wheel, on a scale reduced from FIG. 2;

FIG. 6 is a section on the scale of FIG. 5, taken approximately along the indicated line 6—6 of FIG. 4;

FIG. 7 is a section taken approximately along the indicated line 7—7 of FIG. 6;

FIG. 12 is a view of the unit as seen from its forward end and partly broken away to show parts of the resilient means of the control and of the means by which its effectiveness may be varied;

FIG. 13 is a fragmentary view of the shifter taken transversely thereof and of the detent in control thereof;

FIG. 14 is a fragmentary view of the shifter taken lengthwise thereof also showing the position of the detent in the neutral position of the shifter;

FIG. 15 is a section taken approximately along the indicated line 15—15 of FIG. 6 but on an increase in scale;

FIG. 16 is a perspective view of one of the ratchets shown in FIG. 15;

FIG. 19 is a section, on an increase in scale relative to FIG. 18, taken lengthwise of the handgrip control.

THE PREFERRED EMBODIMENT OF THE INVENTION

Figure 1:
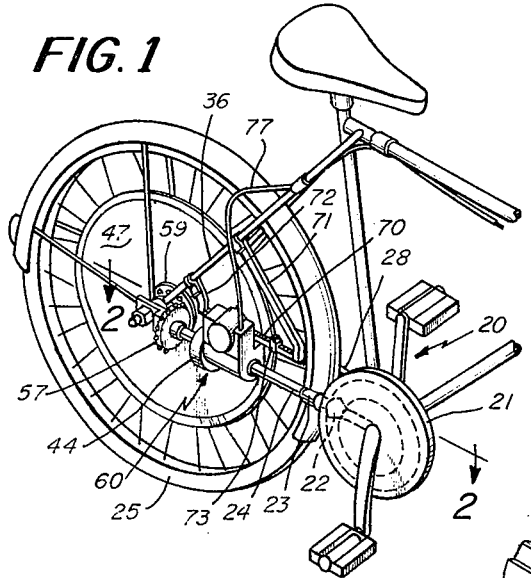
FIG. 1 is a perspective view of rearward portions of a bicycle equipped with a transmission in accordance with the invention together with associated parts and coaster brake attachments.

In FIGS. 1, 2, and 3 there are shown rearward portions of a bicycle equipped with a transmission in accordance with the invention.

A conventional crankset, generally indicated at 20 includes a bevel gear 21 meshing with a bevel pinion 22 fast on the forward end of the section 23 of drive shaft 24 extending radially with respect of the rear wheel 25 at one side thereof. The section 23 is rotatably supported by a bearing unit 26 and an auxiliary support bearing 27, the latter clamped to the rearwardly directed, conventional bicycle strut 28 on the opposite side of the wheel 25 and the rear end of the drive shaft 24 is supported by a bearing unit 29 having an angularly disposed mount portion 30 secured to the axle 31 of the rear wheel by a nut 32 and having a stud 33 entrant into the hole 34 in the wheel-receiving support 35 receiving also the lower terminus of the strut 36 on the side of the wheel 25 on which the shaft 24 is located with the thus-supported shaft making unnecessary a strut on that side corresponding to the strut 28.

As may best be seen in FIG. 3, the rear end of the drive shaft section 23 has a transverse slot 37 in which a tongue 38 from the forward end of the drive shaft 24 is secured by a pivot 39 with the tongue 38 butted against the bottom of the slot 37 but with its outer portion 40 of the butting end arcuate with respect to the pivot 39 thus enabling the shaft 24 to be swung away from the wheel once the nut 32 is removed and the anchoring screw 41 by which the tongue 38 is held against turning is also removed.

Figure 17:
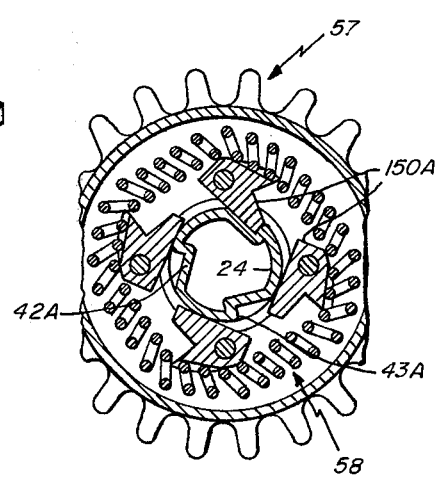
FIG. 17 is a fragmentary section taken approximately along the indicated line 17—17 of FIG. 3.

The drive shaft 24 has uniformly spaced, lengthwise indentations 42 with one set of their corresponding walls providing drive shoulders 43, best seen in FIGS. 15 and 17. A friction wheel 44 is supported by a bearing 45 (FIG. 6) on the shaft 24 so that the shaft may rotate independently thereof and the friction wheel 44 includes a one way clutch, generally indicated at 46 and later detailed, operable to connect the friction wheel 44 to the shaft 24 when the crankset 20 is forwardly pedalled. The periphery of the friction wheel 44 is in driving engagement with a friction disc or member 47 attached to the rear wheel 25 to rotate therewith so that forward pedalling rotates the rear wheel in a forward direction.

The friction member 47 is attached adjacent the wheel hub 48 by means of a clamp 49 adjacent one series of spokes 50 and having a flange 51 to which the friction member 47 is secured by a series of bolts 52 with the series of spokes 50 between the flange 51 and the friction member 47.

A second clamp 53 is secured to the wheel hub 48 adjacent the other series of spokes 54 and includes a series of radial arms 55 to the outer ends of which the friction member 47 is secured by bolts 56.

A cog gear 57, see also FIG. 17, is also rotatably mounted on the rear end of the shaft 24 and it includes a one way clutch, generally indicated at 58 and later detailed, operable to connect the gear 57 to the shaft 24 on reverse pedalling. The gear 57 is in mesh with the slotted gear 59 of the hub coaster brake.

The rear wheel 25 may be removed by removing the nut 32 and the anchoring screw 41 and swinging the drive shaft 24 away from the wheel 25 to an extent such that the cog gear 57 and the friction wheel 44 are disengaged from the coaster brake slotted gear 59 and the friction member 47, respectively.

It will be apparent that the ratio of revolution between the shaft 24 and the rear wheel 25 depends upon the radial position of the friction wheel 44 relative to the friction member 47 and in accordance with the invention, means are provided to shift the friction wheel radially, outwardly to provide a ratio providing for a lower rear wheel speed at the same drive shaft speed and inwardly to provide for a higher rear wheel speed at the same shaft speed.

Figure 5:
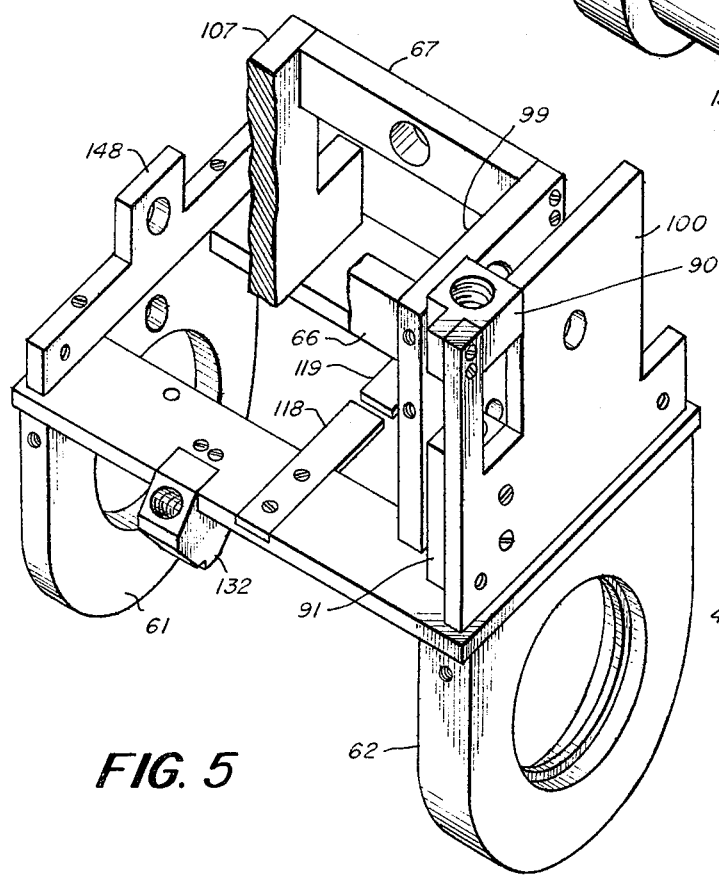
FIG. 5 is a perspective view of the framework of the unit on a further increase in scale relative to FIG. 4.

A shifting unit, generally indicated at 60, includes framework, see FIG. 5, having end portions 61 and 62 with the end portion 61, as may be seen in FIG. 6, supported by a bearing 63 on a tubular shaft 64 through which the drive shaft 24 extends and which rotates with the friction wheel 44, and supported at the end portion 62 by bearings 65 and 65A on shafts 24 and 64 respectively. The friction wheel 44 and extended tubular shaft 64 is additionally supported by bearing 63A affixed upon locations within end portion 61. The framework of the unit 60 includes side bars 66 and 67 in support of a shaft 68 extending at right angles to the shaft 24 and provided with a pinion 69, see FIGS. 7 and 12, in mesh with a rack 70 supported parallel to the shaft 24. by end brackets 71 and 72. see FIG. 3.

As the indentations 42 also serve as splineways, rotation of the pinion 69 in one direction is operable to move the unit 60 and the friction wheel 44 forwardly along the shaft 24 and thus progressively varying the ratio of revolution between the shaft 24 and the rear wheel 25 to decrease the rate at which the rear wheel turns at a given rate of rotation of the shaft 24. With the pinion 69 rotated in the other direction, the unit 60 and the friction wheel 44 are moved rearwardly along the shaft to increase the rate at which the drive wheel 25 will be rotated by the shaft 24 at said given rate. Stops 73 and 74 adjustable lengthwise of the rack 70 limit the travel of the unit 60 and its friction wheel 44.

Figure 18:
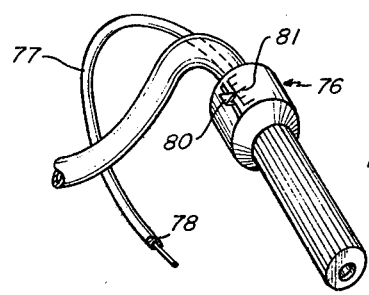
FIG. 18 is a perspective view of the bicycle handgrip pace-setting or cadence control as mounted on the right portion of a handlebar.
Figure 4:
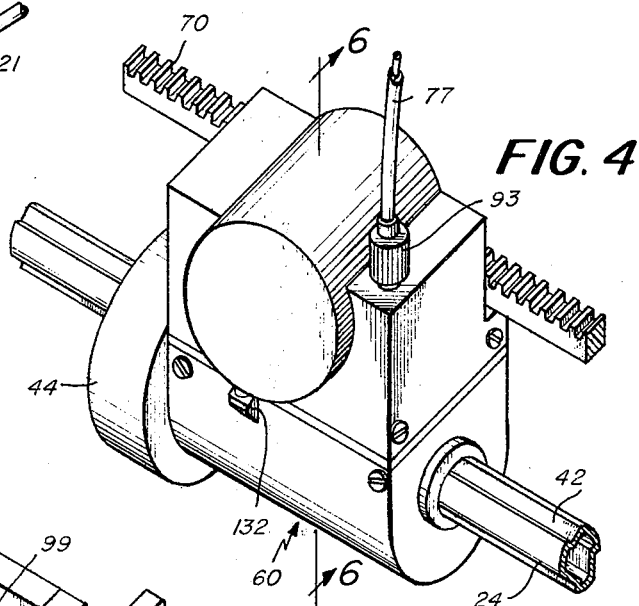
FIG. 4 is a perspective view, on an increase in scale of the transmission.

At this point, it should be noted that an important feature of the invention is that friction wheel to friction member ratio changes occur automatically with the bicyclist pedalling at a constant rate or cadence. The control of such ratio changes is effected by the coaction of means responsive to the speed of the shaft 24, a turbine unit generally indicated at 75, see FIG. 6, and means resiliently opposing the action of the turbine and shown as provided with a rotatable handgrip control 76 operable both to turn the cable 77 within its flexible sheathing 78 and worm 79 fixed to the turning cable 77 and operable as it turns to translate the pointer 80 relative to the graduations 81 to indicate the relative increase or decrease in the automatically pedalling cadence wanted by the cyclist in relation to the centered, normal cadence, set position illustrated in FIG. 18.

Figure 8:
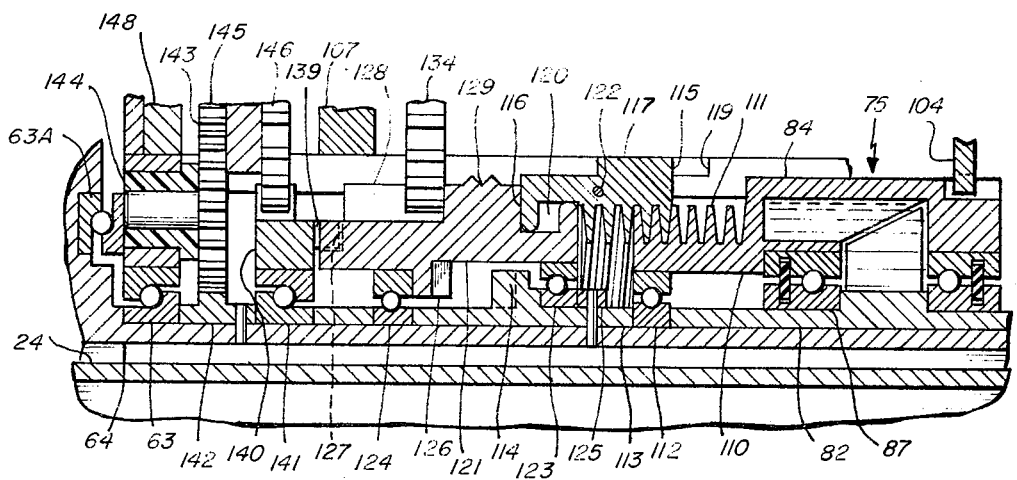
FIG. 8 is a fragmentary section taken substantially along the same line as FIG. 6 but on a further increase in scale and showing the shifter positioned by the speed responsive means of the actuator to render the first connection operative.
Figure 9:
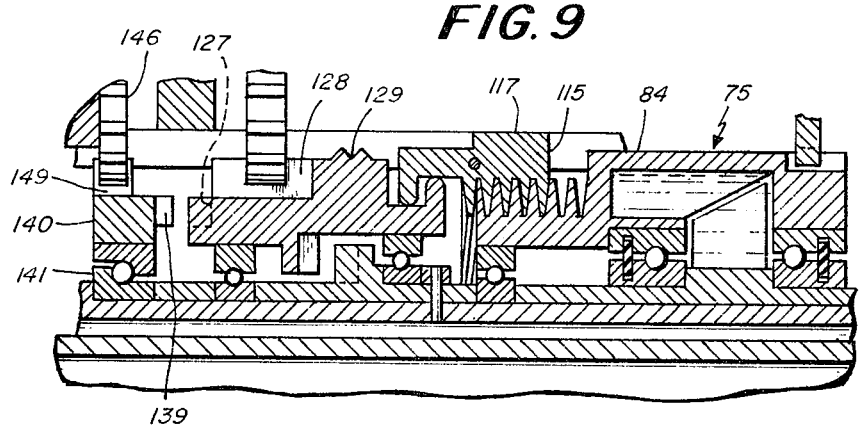
FIG. 9 is a somewhat similar view showing the shifter neutrally positioned by the actuator of the control.
Figure 11:
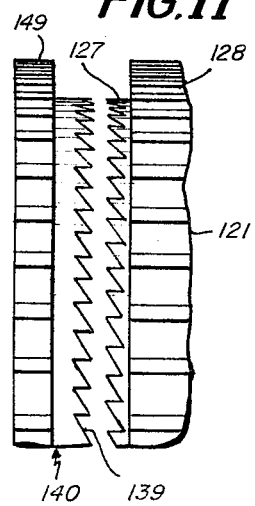
FIG. 11 is a fragmentary view of the two ring gears showing their teeth by which they become engaged to rotate together, the teeth being shown in their disengaged relation.
Figure 10:
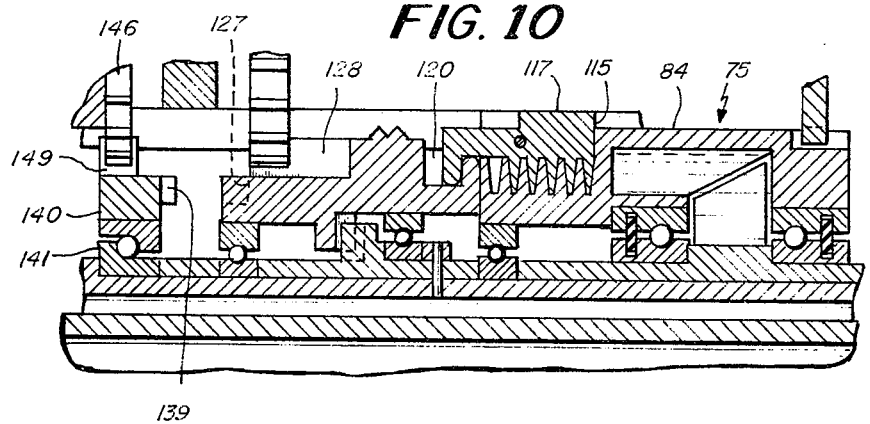
FIG. 10 is a like view illustrating the shifter positioned by the resilient means of the actuator to render the second connection operative.

Referring next to FIGS. 6 and 8, the turbine unit 75 includes a base 82 in the form of a sleeve encircling the shaft 64 and pinned thereto to rotate therewith. The turbine base 82 includes a series of radially disposed rotor blades 83 within a housing 84 provided with a set of radially disposed stator blades 85. The housing 84 is filled with a suitable liquid and is supported on the base 82 by leakproof bearings 86 and 87, and has a peripheral series of gear teeth 88.

The means opposing the operation of the turbine unit 75 that are adjustable by the handgrip control 76 includes a worm 89, see FIG. 12, within the unit 60 which is bearing supported in frame members 90 and 91 with its shaft 92 joined by a connector 93 to the proximate end of the cable 77. The worm 89 meshes with a worm gear 94, see FIG. 6, in turn supported by a bearing 95 on a shaft 96 to rotate independently thereof and the shaft 96 has its bearings 97 and 98 secured in the walls 99 and 100 of the framework. A gear 101 and one end of a coil spring 102 are fast on the shaft 96 and the other end of the spring 102 is connected to the worm gear 94 adjacent its periphery. A spin gear pair 103 and 104 is mounted on a shaft 105 by bearing 106 for rotation independently thereof and the shaft 105 has its ends extending through the walls 99 and 107 of the framework with its shaft support bearings indicated at 108 and 109. The smaller gear 103 is in mesh with the gear 101 and the larger gear 104 is in mesh with the gear teeth 88.

From the foregoing, it will be apparent that, with the handgrip control 76 in its normal position, at a predetermined rate of rotation of the shaft 24, the turbine 75 is operative to rotate the turbine housing 84 against the opposition of the spring 102 and if the shaft speed drops below said predetermined rate, the spring 102 becomes operative to rotate the housing 84 in the opposite direction. In addition, it will be apparent that by rotating the handgrip control 76 in one direction or the other, the predetermined rate can be increased or decreased to provide the cadence desired by the cyclist.

In order that such rotations of the turbine housing 84 may be utilized to translate the unit 60 and its friction wheel 44 in the desired direction and to the desired extent to enable the selected cadence to be maintained, the housing 84 has a rearwardly disposed cylindrical extension 110 (at an increased scale in FIG. 8) provided with external threads 111 and supported by a bearing 112 on the shaft 64 between the turbine base 82 and a sleeve 113 pinned to the shaft 64 and including a ring gear 114, as means for controlling the direction of unit 60 translation.

An internally threaded cylinder 115 is threaded on the housing extension 110, on threads 111 and includes an inwardly disposed annular extension 116 at its rearward end and an upwardly disposed lug 117 slidable in the slot defined by the space between the proximate ends of the framework members 118 and 119, see FIG. 5. The annular extension 116 fits slidably within an annular channel 120 in the forward end of a cylindrical multiple gear shifter 121 and in order to permit assembly, the cylinder 115 includes lengthwise sections detachably interconnected as at 122.

The shifter 121 is supported by bearings 123 and 124, the bearing 123 secured between the ring gear 114 and the ring 125 concentric and affixed to the sleeve 113. The bearing 124 is supported on the shaft 64 rearwardly of the internal ring gear 126 of the shifter 121. At its rear end, the shifter 121 has a series of teeth establishing a ring gear 127. The rearward outer portion of the shifter 121 between the ring gears 126 and 127 includes a relatively long series of teeth defining a gear 128. Adjacent to gear 128, the shifter 121 has a pair of annular shoulders 129 of V-shaped section and between which there is a detent shoe 130, see FIGS. 13 and 14, yieldably urged into engagement therewith by a spring 131 in a detent housing 132 and adjustably backed by a screw 133. The width of the channel 120 is greater than the thickness of the extension 116 in order to avoid interference with response to the functioning of the detent.

A spur gear 134 and a worm 135 are pinned to the shaft 105 between the frame members 107 and 99 with the gear 134 in mesh with the gear 128 and the worm 135 in mesh with a worm gear 136 connected to the shaft 68 by an adjustable friction clutch 137, see FIG. 7. A coil spring 138 is also connected to the shaft 68.

From the foregoing, it will be apparent that when the turbine is able to overcome the resistance of the spring 102, the housing 84 is so turned that the shifter 121 is moved rearwardly when the resistance of the detent 130 is overcome and on such rearward movement, its gear 127 engages the ring gear portion 139 of the dual gear 140 supported by a bearing 141 on the shaft 64 to rotate independently thereof.

A ring gear 142, pinned to the shaft 64 to rotate therewith meshes with an idler gear 143 shaft journalled into a collared bushing 144 mounted in the wall 61 of the framework. A spur gear pair 145 and 146 is mounted on the bearing 147 on the end of the shaft 105 that is between the walls 148 and 107 of the framework to rotate independently of the shaft 105. The smaller gear 145 is in mesh with the idler gear 143 and the larger spur gear 146 is in mesh with the gear portion 149 of the dual gear 140. As a consequence, with the gear 127 engaged with the ring gear portion 139, and the shaft 24 pedal rotated in a forward direction, the shaft 105 is rotated in a direction such that the pinion 69 rotates to translate the shifting unit 60 and the friction wheel 44 rearwardly.

It will also be apparent that when the spring 102 is in control of the turbine housing 84, the housing 84 is rotated to pull the shifter 121 forwardly, once the resistance of the detent 130 is overcome. Should the turbine and the opposition of the spring 102 be in balance, the detent 130 will remain between the shoulders 129, a neutral is attained but should the spring 102 continue its dominance, the detent 130 yields and the shifter 121 is pulled further forwardly until the gears 126 and 114 thus couple the shifter 121 to the shaft 64 so that they rotate together, the shafts 105 and 68 then rotating in the reverse direction causing the pinion 69 to so rotate as to translate the unit 60 and the friction wheel 44 forwardly.

It will be apparent that when the bicycle is stopped, the friction wheel 44 will be as close to the periphery of the friction member 47 as the forward rack stop 73 permits.

Referring next to FIG. 15, the one way clutch 46 is shown as having a series of ratchets 150 supported by shafts 151 arranged circularly about the drive shaft 24 within the friction wheel 44 and journalled therein at locations 152 and 153, see FIG. 6. Each ratchet is trough shaped, see FIG. 16, on its outer surface to accommodate radially directed pressure from the encircling spring 154, enabling any ratchet 150 to enter a lengthwise shaft indentation 42 and to bear upon its shoulder 43 thereby to cause the friction wheel 44 and the tubular shaft 64 to rotate together with the drive shaft 24 during forward pedalling.

The one-way clutch 58 by which the cog gear 57 is connected to the drive shaft 24 is shown in FIG. 17 and is generally similar to the one-way clutch 46 and accordingly will not be detailed, the corresponding parts being distinguished by the suffix addition A to the appropriate reference numeral. The only substantial difference between the clutches being that the ratchets 150A are reversed relative to the ratchets 150 and the shaft indentations 42A are reversed relative to the indentations 42.

From the above, it should be observed that rotational ratio changes between the driving friction wheel and its mating rear wheel occur in a continuously automatic manner in accordance with speed sensing devices and/or manual override regardless of pedalling conditions.

I claim:

1. A transmission for a vehicle of the type having a wheel to which power is to be applied to rotate it and a drive to provide wheel-turning power, said transmission including a friction member coaxially mounted with respect to said wheel to rotate therewith, a drive shaft disposed close to and radially with respect to the friction member and connected to said drive, a unit slidably mounted on said shaft with said shaft rotatable independently thereof, a friction wheel, means connecting said friction wheel to said shaft to slide therealong and to rotate therewith when the shaft is rotated in a direction to advance the vehicle, said friction wheel and said unit connected to move together along said shaft, the periphery of the friction wheel in engagement with said friction member, the ratio of revolution between the shaft and the friction member dependent on the radial position of the friction wheel relative to the friction member, said unit including means operable to shift said friction wheel and said unit along said shaft and having first and second connections with said friction wheel, the first operable to cause said shifting means to move said friction wheel and said unit in a direction to increase said ratio and the second operable to cause said shifting means to move said friction wheel and said unit in the opposite direction to decrease said ratio, said unit also including a control to actuate said shifting means to maintain the rotation of the shaft substantially constant at a predetermined rate, said control including first means responsive to the speed of the friction wheel and second means providing predetermined yieldable opposition to the first control means, said first and second control means coacting to actuate said shifting means to render said first connection operative if the friction wheel speed is above said predetermined rate thereby to permit a decrease in shaft speed until it reaches said predetermined rate and to render said second connection operative if the friction wheel speed drops below said rate thereby to permit a higher shaft speed appropriate for the slower rate at which said vehicle wheel turns.

2. The transmission of claim 1 in which the means to shift the unit and the friction wheel include a fixed rack parallel to said shaft and the shifting means includes a gear train having a shaft extending from the unit transversely of the rack and a pinion fixed on said shaft and in mesh with the rack.

3. The transmission of claim 2 in which the friction wheel includes a tubular shaft through which the drive shaft extends and which is rotatable independently thereof, a shifter is slidably and rotatably mounted on said tubular shaft and includes a gear that is the driving gear of said train, the speed responsive means is connected to said tubular shaft to be driven thereby, and the control includes means connected to said shifter and operable to move it axially relative to a neutral position, rearwardly into a position rendering said first connection operative to drive the gear train in one direction and forwardly into a position rendering said second connection operative to drive said gear train in the opposite direction, said driving gear connected to said gear train in any of said positions of the shifter.

4. The transmission of claim 3 in which the shifter has a cylindrical portion provided with two spaced annular shoulders and the unit includes a resilient detent normally confined between said shoulders but in said neutral position yieldable to permit axial movement of said shifter into either of its other positions.

5. The transmission of claim 3 in which the first connection includes a gear train connected to the tubular shaft and a ring gear rotatable independently thereof and counter thereto, the second connection is a ring gear axially spaced from the first named ring gear and connected to the tubular shaft to rotate therewith, and the shifter includes first and second axially spaced ring gears, the first, interlocking with the ring gear of the first connection in the rearward position of the shifter and the second interlocking with the second ring gear in the forward position thereof.

6. The transmission of claim 2 in which the shaft of the rack engaging pinion includes a second gear rotated by the gear train and a friction clutch connecting the second gear to the pinion shaft.

7. The transmission of claim 6 in which the second gear is a worm gear and the gear train includes a worm in mesh therewith.

8. The transmission of claim 7 in which the rack includes stops to limit the extent to which the friction wheel and unit can travel along the drive shaft and the friction clutch is yieldable when either stop is engaged.

9. The transmission of claim 6 and a coil spring connected to said pinion gear shaft in a manner such that its unwinding force is operable to accelerate the turning of the pinion when the gear train is driven by the first connection and the spring is rewound when the gear train is driven by the second connection.

10. The transmission of claim 1 in which the drive shaft and the proximate face of the friction member are so disposed relative to one another that the friction wheel is engaged by the friction member with progressively increasing pressure as it is translated radially towards the periphery of the friction member.

11. The transmission of claim 1 and means operable to adjust the opposing means to vary said predetermined rate.

12. The transmission of claim 3 in which the speed responsive means includes a member rotated in one direction thereof, said member surrounding the tubular shaft and rotatable independently thereof, the opposing means is connected to said member to rotate it in the opposite direction, the means connecting the control to the shifter is a cylindrical actuator threaded on said member having a rotatable connection with the shifter, and means holding said actuator against rotation but permitting its axial movement as said member is rotated in one direction or the other.

13. The transmission of claim 12 in which the connection between the member and the shifter provides limited axial play and the unit includes a yieldable detent connected to the shifter to provide limited opposition to its movement from any of its positions.

14. The transmission of claim 12 in which the speed responsive means includes a stator fixed on said tubular shaft and defining with said rotatable member a sealed, liquid-filled chamber, said stator and said member each having a series of blades within said chamber.

15. The transmission of claim 12 in which the rotatable member of the speed responsive means has an external series of teeth defining a gear, and the opposing means of the control includes a gear train in mesh with said gear, and a coil spring connected to said gear train to drive said train counter to the speed responsive means.

16. The transmission of claim 15 and operator controlled means to wind and unwind said spring thereby to vary the opposition to the speed responsive means.

17. The transmission of claim 16 in which the operator controlled means includes a worm gear to which one end of the spring is anchored, a worm in mesh with the worm gear, a cable connected to said worm, and a rotatable handgrip to which the cable is connected.

18. The transmission of claim 1 in which the vehicle wheel includes a coaster brake including a coaxial slotted gear, a cog gear is positioned on the drive shaft and includes a one way clutch operable to connect said cog gear to the drive shaft when the drive shaft is turned in the opposite direction.

* * * * *